US012614902B2

(12) United States Patent (10) Patent No.: US 12,614,902 B2
Mayer et al. (45) Date of Patent: Apr. 28, 2026

(54) INTELLIGENT SEMICONDUCTOR SWITCH

(71) Applicant: Infineon Technologies AG, Neubiberg (DE)

(72) Inventors: Alexander Mayer, Treffen (AT); Robert Illing, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 281 days.

(21) Appl. No.: 18/188,797

(22) Filed: Mar. 23, 2023

(65) Prior Publication Data

US 2023/0307902 A1 Sep. 28, 2023

(30) Foreign Application Priority Data

Mar. 24, 2022 (DE) .......................... 102022106935.4

(51) Int. Cl.
| | |
|---|---|
| *H02H 3/087* | (2006.01) |
| *H02H 3/08* | (2006.01) |
| *H02H 5/04* | (2006.01) |
| *H02H 9/02* | (2006.01) |

(52) U.S. Cl.
CPC ............ H02H 3/087 (2013.01); H02H 3/085 (2013.01); H02H 5/048 (2013.01); H02H 9/025 (2013.01)

(58) Field of Classification Search
CPC .......... H02H 3/025; H02H 3/08; H02H 3/085; H02H 5/041; H02H 9/02; H02H 9/025; H02H 3/087; H02H 5/048
See application file for complete search history.

(56) References Cited

U.S. PATENT DOCUMENTS

| | | | |
|---|---|---|---|
| 2011/0110009 A1* | 5/2011 | Sugimoto | .......... H03K 17/0822 |
| | | | 361/93.1 |
| 2013/0176755 A1* | 7/2013 | Armstrong | ............... H02H 3/08 |
| | | | 363/52 |
| 2014/0247523 A1* | 9/2014 | Kawano | ................ H02M 3/158 |
| | | | 361/18 |
| 2016/0226238 A1* | 8/2016 | Matsushita | ............ H02H 9/025 |
| 2017/0294772 A1 | 10/2017 | Illing et al. | |

(Continued)

FOREIGN PATENT DOCUMENTS

| | | | | |
|---|---|---|---|---|
| CN | 105098708 A | * | 11/2015 | ............. H02H 7/228 |

OTHER PUBLICATIONS

Translation of CN 105098708A. Nov. 25, 2015. (Year: 2015).*

(Continued)

*Primary Examiner* — Thienvu V Tran
*Assistant Examiner* — Christopher J Clark
(74) *Attorney, Agent, or Firm* — Slater Matsil, LLP

(57) ABSTRACT

A circuit for a smart semiconductor switch includes an electronic switch electrically coupled between an output node and a supply node. An overcurrent protective circuit is configured to generate an overcurrent signal in response to a load current flowing through the electronic switch exceeding a first overcurrent threshold, and to cause the electronic switch to be tripped. A control circuit is configured to switch the electronic switch on and off based on an input signal in a first mode, and to drive a load connected to the output node by repeatedly switching the electronic switch on and off in a second mode, and to prevent the electronic switch from being permanently tripped by the overcurrent protective circuit.

15 Claims, 4 Drawing Sheets

(56) References Cited

U.S. PATENT DOCUMENTS

| | | | |
|---|---|---|---|
| 2019/0123541 A1 | 4/2019 | Takuma et al. | |
| 2021/0184583 A1* | 6/2021 | Tanghe | H02M 1/08 |
| 2021/0288637 A1* | 9/2021 | Takuma | H02H 9/025 |

OTHER PUBLICATIONS

NXP, Freescale Semiconductor "Single Intelligent High-current Self-protected High-side Switch (2.0 mOhm)," Document No. MC33982 Rev. 18.0, Sep. 2014, 37 pages.

NXP Semiconductors, "Data sheet: Advance Information," 17 mOhm and 7.0 mOhm high-side switches, Document No. MC12XS6D1 Rev. 4.0, May 2018, 72 pages.

* cited by examiner

INTELLIGENT SEMICONDUCTOR SWITCH

CROSS-REFERENCE TO RELATED APPLICATIONS

This application claims priority to German Application No. 102022106935.4, filed on Mar. 24, 2022, which application is hereby incorporated herein by reference.

TECHNICAL FIELD

The present description relates to the field of smart semiconductor switches, which, besides the switching element (e.g. a MOS transistor), comprise further circuits for "smart" operation of the switch.

BACKGROUND

A wide variety of types of smart semiconductor switches are known for different applications (e.g. in automotive or industrial applications). Such semiconductor switches contain further circuits besides the actual switch (usually a high-side power MOSFET), for example in order to switch the switch on and off and in order to output diagnostic information (e.g. load current, temperature, etc.) if appropriate or to protect the switch against overload (e.g. due to excessive temperature or excessive load currents). A smart semiconductor switch can also comprise multiple channels, each of which contains a switch for driving a load.

Smart semiconductor switches can comprise temperature sensors, and also a protective circuit that deactivates the switch in the event of excessive temperature in order to prevent a thermal overload. In some applications, both the junction temperature of the semiconductor switch and a chip temperature away from the semiconductor switch are measured. The protective circuit can then evaluate e.g. the temperature difference between the junction temperature and the chip temperature away from the semiconductor switch. A current measuring circuit may also be implemented in order to measure the load current flowing through the semiconductor switch. In the simplest case, a current measuring resistor can be used for current measurement. However, other approaches for current measurement are also known, such as e.g. the use of a few transistor cells as a "sense transistor". The thresholds for an overcurrent tripping or an overtemperature tripping can be configurable, with the result that the smart semiconductor switch can be matched to different applications.

For some applications, such as for example switching capacitive loads, existing concepts are inflexible, and the inventors have identified a need for improvements.

SUMMARY

In various embodiments, the present disclosure provides a circuit for a smart semiconductor switch. According to one exemplary embodiment, the circuit includes: an electronic switch electrically coupled between an output node and a supply node; an overcurrent protective circuit configured to generate an overcurrent signal in response to a load current flowing through the electronic switch exceeding a first overcurrent threshold, and to cause the electronic switch to be tripped; and a control circuit configured to in a first mode, switch the electronic switch on and off based on an input signal, and, in a second mode, drive a load connected to the output node by repeatedly switching the electronic switch on and off, and prevent the electronic switch from being permanently tripped by the overcurrent protective circuit.

In addition, a method for a smart semiconductor switch is provided in one or more embodiments. According to one exemplary embodiment, the method includes switching an electronic switch on and off based on an input signal in a first mode, the electronic switch being electrically coupled between an output node and a supply node. The method further includes causing the electronic switch to be tripped in response to detecting that a load current flowing through the electronic switch has exceeded a first overcurrent threshold. In addition, the method includes driving a load connected to the output node by repeatedly switching the electronic switch on and off in a second mode and preventing the electronic switch from being permanently.

In one or more embodiments, a device is provided that includes a capacitive load switching mode detection circuit configured to output a capacitive load switching signal based on an input signal. A control circuit is configured to activate a normal mode or a capacitive load switching mode based on the capacitive load switching signal. An overcurrent threshold generation circuit is configured to generate a first overcurrent threshold in the normal mode and a second overcurrent threshold in the capacitive load switching mode, and the second overcurrent threshold is higher than the first overcurrent threshold. An overcurrent protective circuit is configured to: generate a first overcurrent signal in response to a load current flowing through the electronic switch exceeding the first overcurrent threshold in the normal mode; and generate a second overcurrent signal in response to the load current exceeding the second overcurrent threshold in the capacitive load switching mode.

BRIEF DESCRIPTION OF THE DRAWINGS

Exemplary embodiments are explained in greater detail below with reference to figures. The illustrations are not necessarily to scale and the exemplary embodiments are not restricted only to the aspects illustrated. Rather, importance is attached to presenting the principles underlying the exemplary embodiments. In the figures.

DETAILED DESCRIPTION OF ILLUSTRATIVE EMBODIMENTS

Figure 1:
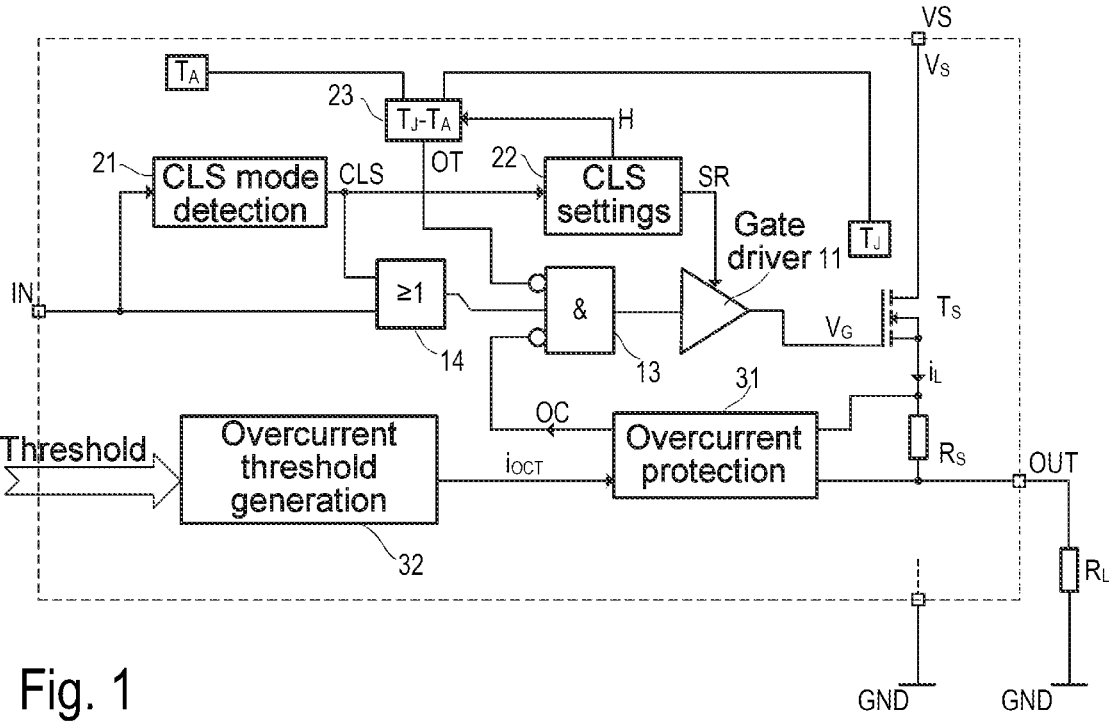
FIG. 1 illustrates an example of a circuit that can be used as a smart semiconductor switch.

Before various exemplary embodiments are discussed in more detail, an example of a smart semiconductor switch will first be explained. The example depicted in FIG. 1 shows a smart semiconductor switch having one channel, i.e. one power transistor $T_S$ for driving a load. It goes without saying that the concepts described here can also be applied to multichannel systems. The switching element in the example shown is a MOS transistor, in particular a MOSFET (metal-oxide semiconductor field effect transistor) in the form of a DMOS field effect transistor (double-diffused metal-oxide semiconductor field effect transistor). It goes without saying that other types of electronic switches may also be used, such as e.g. bipolar transistors, IGBTs (insulated gate bipolar transistors) or the like.

In the example depicted in FIG. 1, the switching element (power transistor $T_S$) is connected between an output node OUT and a supply node VS. Both the output node OUT and the supply node VS can be connected directly (e.g. by way of bonding wires or the like) to appropriate chip contacts (e.g. pins). That is to say that when the power transistor $T_S$ is activated (on) the load current flows from the supply node VS (which is connected to a power supply) via the load current path of the power transistor $T_S$ to the output node OUT, which, during operation, is connected to a load that is symbolized by the resistor $R_L$ in FIG. 1. In the present case, the power transistor $T_S$ operates as a high-side switch. It goes without saying that the concepts described here can also be applied to systems containing low-side switches.

The fact that the power transistor $T_S$ is connected between the nodes VS and OUT does not preclude a further element such as e.g. the current measuring resistor $R_S$ from being able to be arranged between the power transistor $T_S$ and one of the nodes VS or OUT. In the example shown, the measuring resistor $R_S$ (sense resistor) is connected between the source electrode of the (n-channel) power transistor $T_S$ and the nodes OUT. The voltage drop $i_L \cdot R_S$ across the measuring resistor $R_S$ represents the load current $i_L$ flowing through the load current path (in the case of a MOS transistor the drain-source current path) of the transistor.

The control electrode of the power transistor $T_S$ (in the case of a MOS transistor the gate electrode) is driven by a gate driver circuit ii. Said circuit is designed to take a logic signal ON (input signal of the gate driver) as a basis for switching the power transistor $T_S$ on and off. The gate driver 11 may also be designed to control the gradient of the switching edges (i.e. the slew rate). In the example shown, the slew rate is dependent on the signal SR supplied to the gate driver 11. Suitable gate driver circuits are known per se and are therefore not discussed in more detail here.

The logic signal ON is the result of a logic function relating to multiple other logic signals. In the example shown, the logic signal ON is output by the AND gate 13, which performs the function ON=$\overline{OT} \cdot IN' \cdot \overline{OC}$. The dot ("·") denotes a logic AND function and the overline above OT and OC denotes a negation. OT is a logic signal that indicates an overtemperature state, and OC is a logic signal that indicates an overcurrent state. In the example shown, both an overtemperature state (OT=1, $\overline{OT}$=0) and an overcurrent state (OC=1, $\overline{OC}$=0) result in the power transistor $T_S$ being tripped. The logic signal IN' can be regarded as a switching command for switching the transistor $T_S$ on and off. It is dependent on the input signal received at the input node IN. The logic signal IN' signals that the transistor $T_S$ is switched on if either the input signal received at the input node IN indicates a logic "1" or the signal CLS indicates a logic "1". CLS can also be understood as the abbreviation for "capacitive load switching" (switching a capacitive load). In the example shown, this OR function is performed by the OR gate 14, the output signal from which is the logic signal IN'. The CLS mode will be explained in more detail later on, but overcurrent and overtemperature protection are discussed first.

The overcurrent protective circuit 31 depicted in FIG. 1 is designed to compare the current measurement signal with an associated threshold. In the present example, the overcurrent protective circuit 31 signals an overcurrent state (OC=1) if the load current $i_L$ exceeds the associated threshold $i_{OCT}$ (e.g. $i_L \cdot R_S > i_{OCT} \cdot R_S$). Essentially, the overcurrent protective circuit 31 contains a comparator circuit. Suitable comparator circuits are known per se and are therefore not discussed further here. The specific implementation of the overcurrent protective circuit 31 is also dependent, inter alia, on the current measuring circuit used. Instead of the current measuring resistor $R_S$ shown, a so-called sense FET arrangement can also be used, in which some transistor cells of the power transistor are used for current measurement.

The threshold $i_{OCT}$ is configurable and, in the example shown, is generated by the circuit 32 (denoted by "overcurrent threshold generation" in FIG. 1) on the basis of the input from an external circuit. The overcurrent protective circuit 31 receives the present threshold $i_{OCT}$ from the circuit 32. The latter can receive a signal containing information about the desired threshold $i_{OCT}$ from an external circuit, e.g. an external controller. In one example, the circuit 32 can communicate with an external controller by way of a digital communication interface, for example by means of an SPI (Serial Peripheral Interface). Alternatively, configuration of the threshold by means of a component (e.g. resistor) connected to a configuration pin is also possible (cf. FIG. 5).

In the example shown, two temperature values are measured. A first temperature value $T_J$ represents the temperature of the transistor cell array of the power transistor $T_S$, ideally the junction temperature of the power transistor. Alternatively, a temperature measurement in the hot area close to the transistor is also possible. A second temperature value $T_A$ represents the chip temperature away from the power transistor, i.e. at a comparatively "cool" place on the semiconductor chip as far away as possible from the "Hot-Spot" in the transistor cell array. Suitable temperature sensors integrated in the chip are known per se and are therefore not described further here. The overtemperature protective circuit 23 is designed to take the two temperature measured values $T_J$ and $T_A$ as a basis for indicating an overtemperature state (OT=1).

An overtemperature state can be triggered by various circumstances. By way of example, the overtemperature protective circuit 23 may signal an overtemperature state if the junction temperature $T_J$ of the transistor $T_S$ exceeds a temperature threshold, which in some embodiments may represent a permissible maximum value $T_{J,max}$ ($T_J > T_{J,max}$). Furthermore, the overtemperature protective circuit 23 may signal an overtemperature state if the temperature difference $T_J - T_A$ exceeds a temperature difference threshold, which in some embodiments may represent a permissible maximum value $\Delta T_{max}$ ($T_J - T_A > \Delta T_{max}$). The overtemperature protective circuit 23 (i.e. the comparator contained therein) can exhibit a hysteresis. As such, for example an overtemperature state may be signalled if the condition $T_J - T_A > \Delta T_{max}$ is satisfied, but the overtemperature state can be cancelled again only if the condition $T_J - T_A < \Delta T_{max} - T_H$ is satisfied. The value $T_H$ here represents the hysteresis. In particular, the values $\Delta T_{max}$ and $T_H$ are configurable. The value $T_{J,max}$ may also be configurable (for example by means of a digital communication interface). The thresholds $\Delta T_{max}$ and $\Delta T_{max} - T_H$ may also be dependent on whether the smart semiconductor switch operates in a CLS mode, which is described below.

As mentioned, CLS denotes switching on a capacitive load (capacitive load switching). Depending on the implementation, the CLS mode can be activated in different ways. By way of example, there may be provision for a specific chip pin, and the CLS mode can be activated if e.g. a high level is applied to this chip pin. In the example shown, the circuit 21 (denoted by "CLS mode detection" in FIG. 1) detects and activates the CLS mode if a pulse-width-modulated (PWM) signal having e.g. a duty cycle of 50 percent and a defined frequency is applied to the input node IN. This frequency can be e.g. in the kilohertz range (e.g. 30 kHz). The circuit 21 can detect this frequency in the input signal and use a high level of the logic signal CLS to indicate the CLS mode (CLS=1). A low level of the logic signal CLS signals a normal mode, in which the transistor $T_S$ is switched on if the signal applied to the input node has a high level.

The transistor $T_S$ is also activated/switched on in the CLS mode, but the transition to the CLS mode results in some operating parameters of the smart semiconductor switch being altered. In the example shown in FIG. 1, the circuit 22 (denoted by "CLS settings" in FIG. 1) is designed to reconfigure the gate driver 11 in such a way that the slew rate (SR) of the switching edges is lowered (compared to the normal mode). In addition, the circuit 22 may be designed to reconfigure the parameters (temperature thresholds and hysteresis) of the overtemperature protective circuit 23 and to reset them to the previous (standard) values again on leaving the CLS mode.

Figure 2:
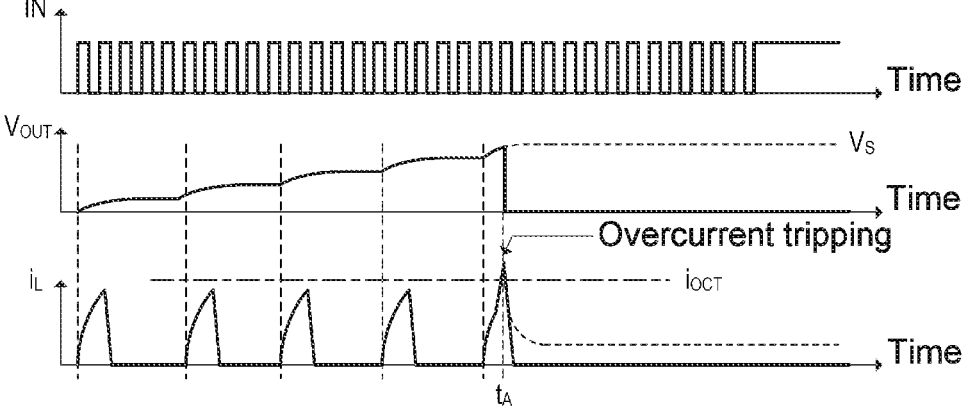
FIG. 2 uses exemplary timing charts to illustrate the operation of the circuit from FIG. 1 on a capacitive load.

When overcurrent protection is active, a problem can arise in the CLS mode that is explained below on the basis of the timing charts shown in FIG. 2. The top chart in FIG. 2 shows one possibility for activating the CLS mode, namely modulating the input signal supplied to the input node IN, said signal likewise being denoted by IN in FIG. 2. The modulation of the input signal is detected by the circuit 21, and the signal CLS is then set to high (CLS=1). Consequently, the logic signal IN' changes to "high" (IN'=1) and so does the logic signal ON (ON=1), therefore, which results in transistor $T_S$ being switched on. FIG. 2 relates to the case of a capacitive load, resulting in a very high inrush current.

The high inrush current can result in very rapid heating of the transistor $T_S$ and in an overcurrent tripping due to the condition $T_J$-$T_A$>$\Delta T_{max}$ (OT=0), the value $T_{J,max}$ being able to be lower in the CLS mode than in the normal mode. As a consequence of the overcurrent tripping, the transistor $T_S$ cools slightly ($T_J$-$T_A$<$\Delta T_{max}$-$T_H$), resulting in the transistor $T_S$ being switched on again. The hysteresis of the overtemperature protective circuit 23 results in toggling, i.e. regular switching of the transistor $T_S$ off and on again, with the inrush current $i_L$ charging the capacitance of the load further in each cycle and the output voltage $V_{OUT}$ (i.e. the voltage $V_{OUT}$) rising somewhat in each cycle. This process is depicted in the middle chart in FIG. 2. The regular switching of the load current on and off (toggling) is depicted in the third chart in FIG. 2.

In one exemplary embodiment, the permissible maximum value $T_{J,max}$ or the permissible maximum value $\Delta T_{max}$ (or both) is set to higher values in the CLS mode than in the normal mode. The permissible maximum values can be configured on the basis of the level of the logic signal CLS.

Regardless of whether different (higher) permissible maximum values are possibly used in the overtemperature protective circuit 23 in the CLS mode than in the normal mode, in practice it may be that during the "toggling" depicted in FIG. 2 a current peak triggers an undesirable overcurrent tripping in the CLS mode because the load current $i_L$ exceeds the threshold $i_{OCT}$ set for the respective application at least for a short time. In the example depicted in FIG. 2, the overcurrent tripping is triggered at the time $t_A$.

Switching on again after an overcurrent event generally requires the smart semiconductor switch to be reset.

Figure 3:
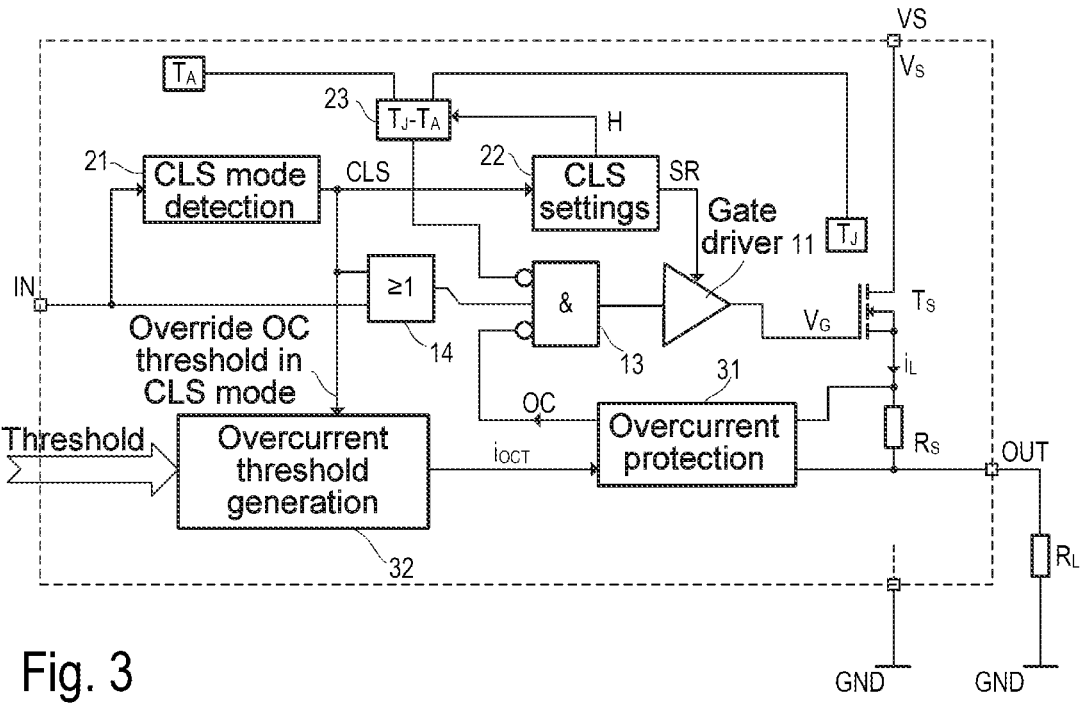
FIG. 3 illustrates a modification of the circuit from FIG. 1, in which the threshold for an overcurrent tripping for a capacitive load is set to a maximum.

FIG. 3 shows a modification of the example from FIG. 1 that facilitates a solution to the problem explained on the basis of FIG. 2. The example depicted in FIG. 3 is broadly identical to the example from FIG. 1, and additional reference is made to the explanations above. The text below primarily discusses the differences between the examples from FIG. 3 and FIG. 1.

Specifically, unlike in the example from FIG. 1, the circuit 32 for generating the overcurrent threshold $i_{OCT}$ in FIG. 3 is designed to generate a different overcurrent threshold for the overcurrent protective circuit 31 in the CLS mode than in the normal mode. While the smart semiconductor switch is not being operated in the CLS mode, the overcurrent threshold $I_{OCT}$ corresponds to the configured value $i_{OCT,set}$. As already mentioned, the circuit 32 is designed to receive information relating to the desired threshold and to set the overcurrent threshold $i_{OCT}$ accordingly. This information can be received via a digital communication interface, for example, or can also be ascertained on the basis of a device parameter of an external component connected to a chip pin (e.g. on the basis of the resistance value of a connected resistor, see FIG. 5). When the CLS mode is active, this configuration is overwritten (override) and the circuit 32 sets the overcurrent threshold $i_{OCT}$ to a predefined or selected standard value $i_{OCT,max}$, which may correspond to a permissible maximum overcurrent threshold, for example. When the CLS mode is left, the overcurrent threshold $i_{OCT}$ is reset from the predefined or selected standard value $i_{OCT,max}$ to the previously configured $i_{OCT,set}$ again.

The (undesirable) permanent overcurrent tripping, depicted in FIG. 2, when a capacitive load is switched on is prevented by temporarily raising the threshold $i_{OCT}$ from $i_{OCT,set}$ to $i_{OCT,max}$. In this context, "permanent" means "until a reset command is received", since the detection of an overcurrent condition $i_L$>$i_{OCT}$ is stored in a latch (flip-flop). That is to say that, after an overcurrent state has been detected, the logic signal OT remains at a high level (OT=1) until the latch is reset. It is therefore not possible for the smart semiconductor switch to automatically switch on again. The reset command generally needs to be produced by an external controller. The control electronics of the smart semiconductor switch (in particular the circuit 21 for detecting the CLS mode and the circuit 32 for overcurrent threshold generation) are thus designed to prevent the electronic switch from being permanently tripped by the overcurrent protective circuit 31 (using the AND gate 13) in the CLS mode.

Figure 4:
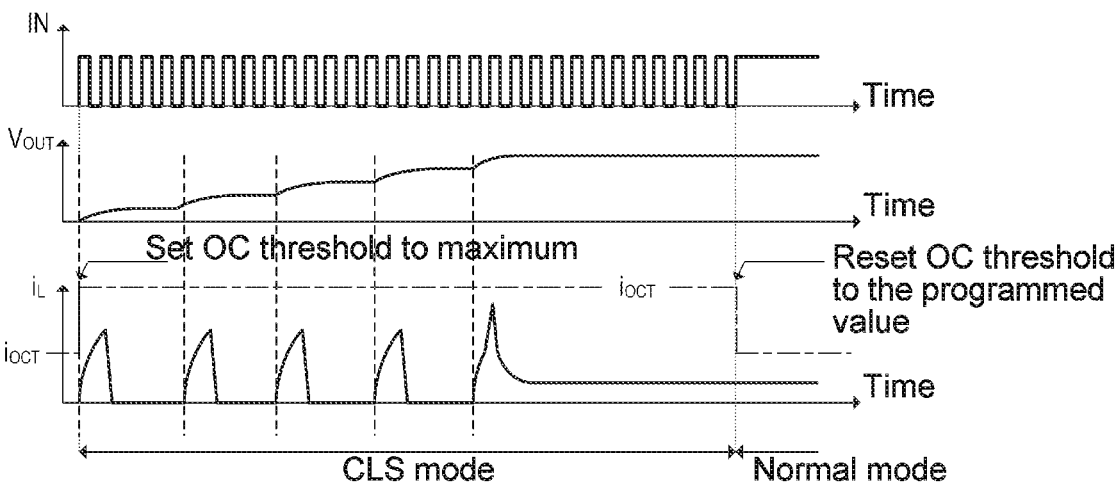
FIG. 4 uses exemplary timing charts to illustrate the functioning of the circuit from FIG. 3 when the capacitive load is connected.

The way in which the circuit from FIG. 3 functions is explained in more detail below on the basis of the timing charts in FIG. 4. The top timing chart in FIG. 4 is the same as in FIG. 2, and in this example too the control command for activating the smart semiconductor switch in the CLS mode consists in a PWM signal with a e.g. 50 percent duty cycle and a defined frequency of e.g. 30 kHz being supplied to the input node IN. This input signal can be generated and supplied to the input node IN e.g. by an external controller (for example a microcontroller).

The bottom timing chart in FIG. 4 shows the characteristic of the load current $i_L$ as the result of the regular switching of the power transistor $T_S$ on and off (toggling), which, as explained above, is dependent on the temperature $T_J$ of the power transistor $T_S$, in particular on the difference temperature $T_J$-$T_A$. The middle timing chart shows the resultant gradual rise in the output voltage $V_{OUT}$ until (approximately) the level of the supply voltage $V_S$ is reached ($V_{OUT} \approx V_S$).

The bottom timing chart likewise depicts the overcurrent threshold $i_{OCT}$ and also the "changeover" of the threshold $i_{OCT}$ from the threshold $i_{OCT,set}$ configured for the respective application to the standard (maximum) value $i_{OCT,max}$ and back to the value $i_{OCT,set}$ again. It can be seen that the temporary increase of the overcurrent threshold $i_{OCT}$ prevents detection of an overcurrent state and the associated permanent tripping of the power transistor (i.e. until a reset command is received).

Figure 5:
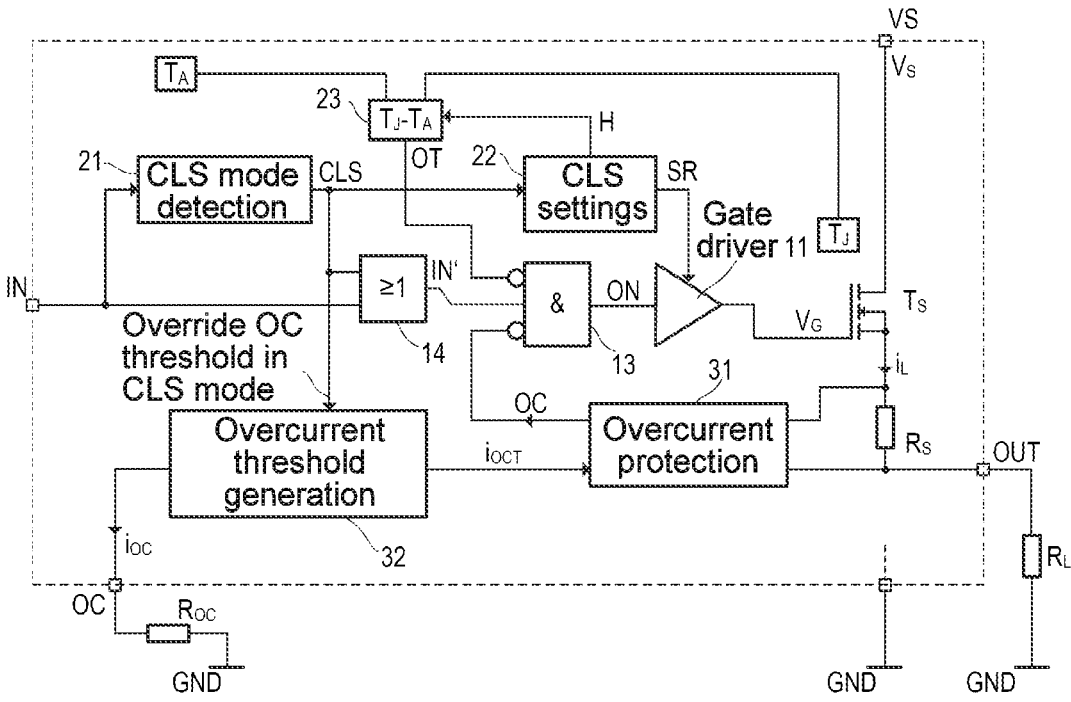
FIG. 5 illustrates a further example of a circuit that can be used as a smart semiconductor switch.

The circuit in FIG. 5 is a modification of the circuit from FIG. 3. In particular, FIG. 5 shows a possible implementation of the circuit 32 that generates the overcurrent threshold $i_{OCT}$ for the overcurrent protective circuit 31. As shown in FIG. 5, the circuit 32 is connected to a configuration pin OC, to which an external resistor, denoted by $R_{OC}$ in FIG. 5, can be connected during operation. The circuit 32 is designed to set the overcurrent threshold $i_{OCT}$ on the basis of the resistance value of the external resistor $R_{OC}$. By way of example, the circuit 32 can apply a defined (e.g. constant) voltage $U_{ROC}$ to the configuration pin OC and set the overcurrent threshold $i_{OCT}$ on the basis of the resultant current $U_{ROC}/R_{OC}$. As in the previous examples already, the overcurrent threshold $i_{OCT}$ is set to a standard value/maximum value if the signal CLS indicates the activation of the CLS mode. When the CLS mode ends, the overcurrent threshold $i_{OCT}$ is reset to the value predefined by the external resistor $R_{OC}$ again. Otherwise, the circuit from FIG. 5 is the same as that in FIG. 3, and reference is made to the above description in relation to FIG. 3.

As mentioned, the circuit 32 (optionally in combination with further circuit components) in the exemplary embodiments described here is designed to prevent the power transistor $T_S$ from being permanently tripped (i.e. up to a reset) by the overcurrent protective circuit 31. According to the examples shown in FIGS. 3 and 5, this permanent tripping is prevented by temporarily—while the CLS mode is active—increasing the overcurrent threshold $i_{OCT}$. In the example from FIG. 6, this permanent tripping is prevented by temporarily, in particular while the CLS mode is active, deactivating the overcurrent circuit 31.

Figure 6:
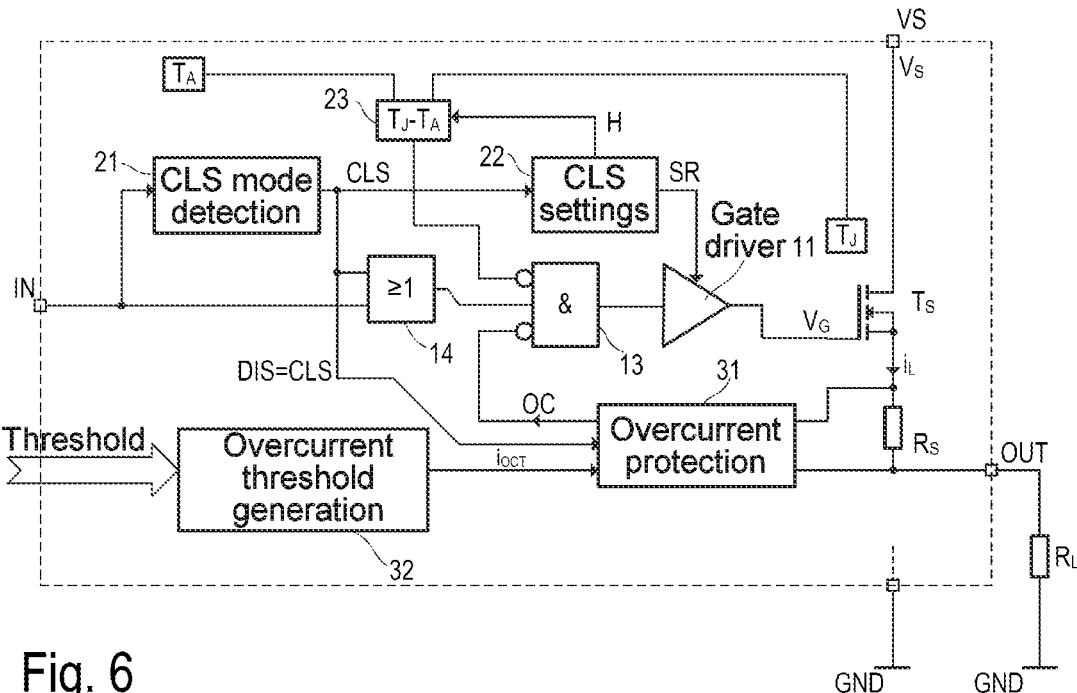
FIG. 6 shows a modification of the example from FIG. 3.

FIG. 6 shows a modification of the circuit from FIG. 3. As shown in FIG. 6, the logic signal CLS, which indicates an active CLS mode, is used as a disable signal DIS for the circuit 31. That is to say that the overcurrent protective circuit 31 is inactive while the CLS mode is active. The circuit 32 generates the desired/configured threshold $i_{OCT}$ for example on the basis of the value of an external resistor. The components in FIG. 6 that are not explained at this juncture are the same as in FIG. 3, and reference is made to the description above.

Figure 7:
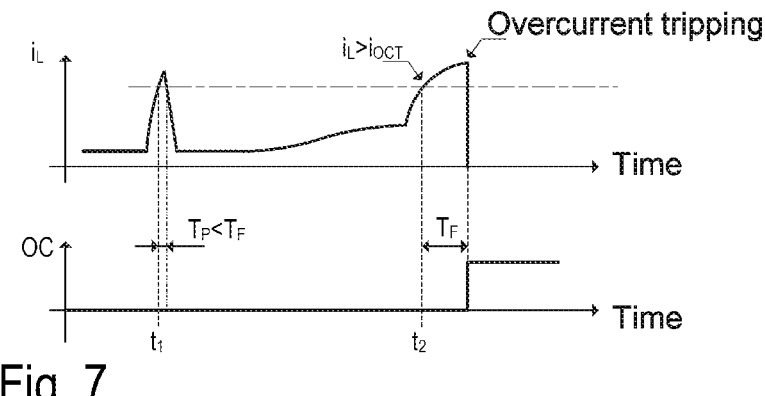
FIG. 7 uses a timing chart to illustrate the filtering of very short, transient overcurrent events.

According to a further exemplary embodiment, the aforementioned permanent tripping is prevented by virtue of the overcurrent protective circuit 31 being designed to signal an overcurrent state (OC=1) at least in the CLS mode only when the overcurrent condition $i_L > i_{OCT}$ is satisfied for a determined, defined delay time. That is to say that an overcurrent state (OC=1) is signaled only after the delay time, and very short, transient incursions above the overcurrent threshold $i_{OCT}$ are filtered/ignored. Suitable circuits that omit/suppress short, transient pulses shorter than the delay time in the logic signal OC are known per se and are therefore not discussed further here. The functioning of such a circuit, which may be contained in the overcurrent protective circuit 31, is shown in FIG. 7. Short, transient overcurrent states $i_L > i_{OCT}$ such as for example at the time $t_1$ (see FIG. 7, overcurrent state from $t_1$ to $t_1 + T_P$) do not result in tripping. As soon as the state $i_L > i_{OCT}$ lasts for a defined delay time $T_F$, an overcurrent state is signalled by the logic signal OC=1 and tripping is triggered (see FIG. 7, overcurrent state from time $t_2$ results in tripping at the time $t_2 + T_F$).

Figure 8:
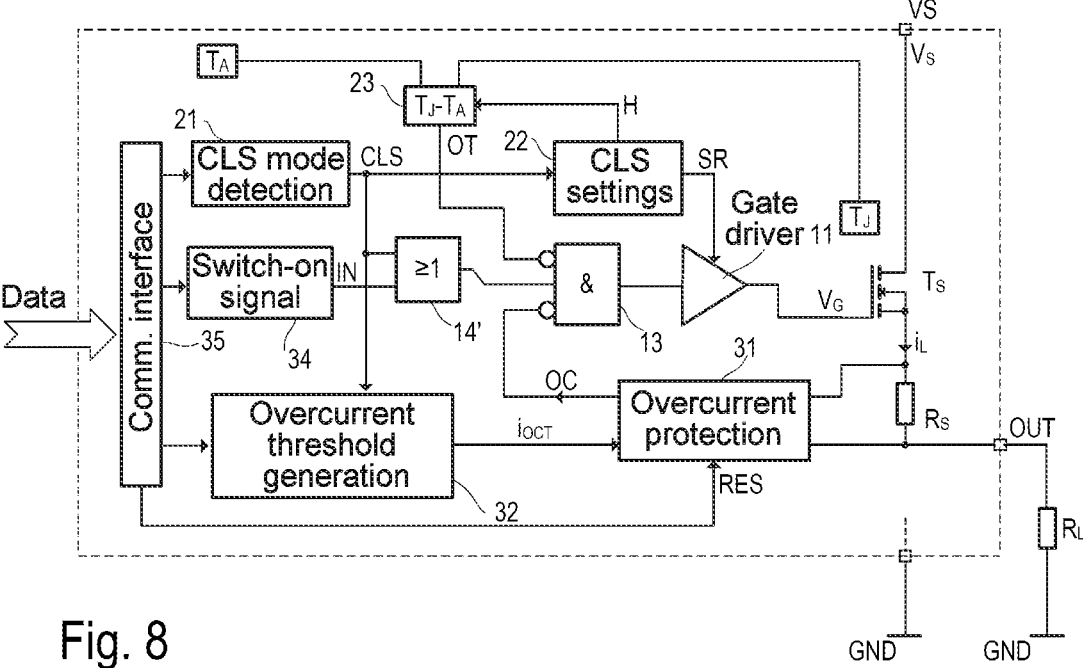
FIG. 8 shows a further modification of the example from FIG. 3.

The example from FIG. 8 is a modification of the example from FIG. 3, in which a switch-on command for activating the power transistor in the normal mode, a command for activating (and optionally deactivating) the CLS mode and the overcurrent threshold to be set are received via a digital communication interface 35. In this example, the switch-on signal IN, which results in the power transistor $T_S$ being switched on, is generated by the logic circuit 34 on the basis of the data received via the interface 35. The circuit 21 generates the logic signal CLS on the basis of the received data. As in the previous examples, a high level of the signal CLS indicates the CLS mode. FIG. 8 likewise shows an explicit reset for the overcurrent protective circuit 31 by way of a command received via the communication interface. In the example shown, the communication interface generates a reset signal RES for the overcurrent protective circuit 31, resulting in a signaled overcurrent state being cancelled and it being possible for the power transistor $T_S$ to be switched on again. It goes without saying that in other exemplary embodiments the reset signal RES can also be generated in another way and does not necessarily have to be generated on the basis of data that are received via a digital interface.

It goes without saying that the circuits depicted in the figures are merely examples. A person skilled in the art is capable of also implementing the same or an equivalent function using (in part) other components. It goes without saying that logic levels at one or more nodes of the circuits can be inverted, which does not result in the functioning of the circuit being changed if the logic components are adapted as appropriate. All of the logic functions can therefore be implemented e.g. using NAND or NOR gates without significantly changing the functioning of the circuit by and large.

What is claimed is:

1. A circuit, comprising:
an electronic switch electrically coupled between an output node and a supply node;
a current measurement circuit configured to measure a load current flowing through the electronic switch to produce a current measurement signal based on the load current;
an overcurrent protective circuit configured to generate an overcurrent signal in response to the load current flowing through the electronic switch exceeding a first overcurrent threshold based on the current measurement signal, the overcurrent signal configured to cause the electronic switch to be tripped; and
a control circuit configured to:
in a first mode, switch the electronic switch on and off based on an input signal, and
in a second mode, drive a load connected to the output node by repeatedly switching the electronic switch on and off based on a temperature of the electronic switch, and prevent the electronic switch from being permanently tripped by the overcurrent protective circuit.

2. The circuit of claim 1,
wherein the load is a capacitive load, and
wherein the control circuit is configured to gradually drive the capacitive load in the second mode by repeatedly switching the electronic switch on and off.

3. The circuit of claim 1, wherein the control circuit is configured to prevent the electronic switch from being permanently tripped by the overcurrent protective circuit in the second mode by replacing the first overcurrent threshold with a second overcurrent threshold that is higher than the first overcurrent threshold.

4. The circuit of claim 1, wherein the control circuit is configured to prevent the electronic switch from being permanently tripped by the overcurrent protective circuit in the second mode by temporarily deactivating the overcurrent protective circuit.

5. The circuit of claim 1, wherein the control circuit is configured to prevent the electronic switch from being permanently tripped by the overcurrent protective circuit in the second mode by causing a filtering of transient overcurrent states that are shorter than a selected delay time.

6. The circuit of claim 1, further comprising:

a configuration circuit configured to be electrically coupled to a resistor, wherein the configuration circuit is configured to set the first overcurrent threshold based on a resistance value of the resistor.

7. The circuit of claim 1, further comprising:

a detection circuit configured to activate the second mode based on at least one of the input signal or a command signal received by the detection circuit.

8. The circuit of claim 7, wherein activating the second mode comprises increasing the first overcurrent threshold.

9. The circuit of claim 7, wherein the detection circuit is configured to activate the second mode in response to the input signal being modulated.

10. The circuit of claim 1, wherein the control circuit comprises a driver circuit configured to drive the electronic switch, the driver circuit being configured to drive the electronic switch at a lower slew rate in the second mode than in the first mode.

11. The circuit of claim 1, wherein the control circuit is configured to trip the electronic switch in response to the temperature of the electronic switch exceeding a temperature threshold.

12. The circuit of claim 1, wherein the control circuit is configured to trip the electronic switch in response to a temperature difference between the temperature of the electronic switch and a temperature of a chip located at a distance from the electronic switch exceeding a temperature difference threshold.

13. The circuit of claim 1, further comprising:

an overtemperature protective circuit configured to trigger an overtemperature tripping of the electronic switch in response to at least one of the temperature of the electronic switch or a temperature difference between the temperature of the electronic switch and a temperature of a chip located at a distance from the electronic switch reaching a permissible maximum value, the permissible maximum value being higher in the second mode than in the first mode.

14. The circuit of claim 1, wherein the current measurement circuit comprises a shunt resistor coupled in series with the electronic switch.

15. The circuit of claim 1, wherein the current measurement circuit comprises a sense transistor arrangement.

* * * * *